(12) United States Patent
Hammond et al.

(10) Patent No.: US 7,804,641 B2
(45) Date of Patent: Sep. 28, 2010

(54) FOCUSING SYSTEM AND METHOD

(75) Inventors: Michael J. Hammond, York (GB);
Gregory T. Reynolds, York (GB)

(73) Assignee: Nanometrics Incorporated, Milpitas, CA (US)

( * ) Notice: Subject to any disclaimer, the term of this patent is extended or adjusted under 35 U.S.C. 154(b) by 401 days.

(21) Appl. No.: 10/572,329

(22) PCT Filed: Sep. 20, 2004

(86) PCT No.: PCT/GB2004/003969

§ 371 (c)(1),
(2), (4) Date: Dec. 12, 2006

(87) PCT Pub. No.: WO2005/029152

PCT Pub. Date: Mar. 31, 2005

(65) Prior Publication Data

US 2007/0081153 A1 Apr. 12, 2007

(30) Foreign Application Priority Data

Sep. 19, 2003 (GB) ................................ 0321918.5

(51) Int. Cl.
*G02B 21/00* (2006.01)
(52) U.S. Cl. ....................................... 359/383; 359/368
(58) Field of Classification Search .......... 359/368–390
See application file for complete search history.

(56) References Cited

U.S. PATENT DOCUMENTS

| 3,708,619 | A | | 1/1973 | Martin | |
|---|---|---|---|---|---|
| 4,025,785 | A | | 5/1977 | Mueller | |
| 4,595,829 | A | | 6/1986 | Neumann et al. | |
| 4,620,089 | A | * | 10/1986 | Schlichting et al. | 250/201.4 |
| 5,245,173 | A | * | 9/1993 | Yamana et al. | 250/201.3 |
| 5,477,303 | A | * | 12/1995 | Goto | 396/114 |
| 6,128,129 | A | * | 10/2000 | Yoneyama | 359/383 |
| 7,109,459 | B2 | * | 9/2006 | Kam et al. | 250/201.4 |

* cited by examiner

*Primary Examiner*—Thong Nguyen
(74) *Attorney, Agent, or Firm*—Silicon Valley Patent Group LLP

(57) ABSTRACT

A method of automatically focusing a microscope in which a beam of light is directed from a light source through an objective of the microscope system to an object whereby light is reflected from the surface thereof; reflected light is collected and directed to an imaging system. The incident beam of light is limited in spatial extent by imaging an aperture to form an illumination pupil, the centroid of illumination of the illumination pupil is aligned with the incident optical axis of the instrument. The reflected light is split in the imaging system into at least one pair of images from eccentric sections of an imaging pupil displaced from the optical axis in opposite directions. The separation of the images thereby produced is determined to provide an indication of the object distance. A focusing system implementing the method and a microscope fitted with such a system are also described.

15 Claims, 1 Drawing Sheet

FOCUSING SYSTEM AND METHOD

CROSS-REFERENCE TO RELATED APPLICATION

Figure 1:
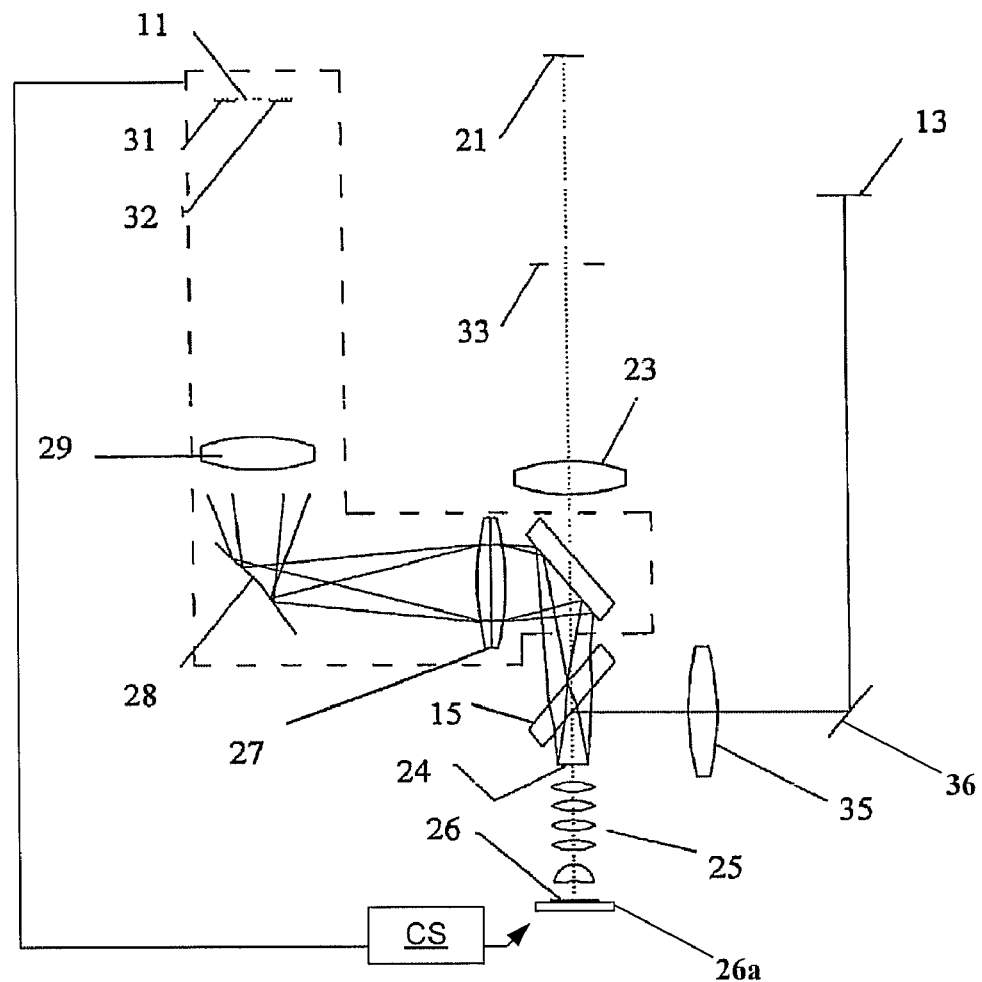

The present application is a U.S. National Phase application of PCT/GB2004/003969, filed 10 Sep. 2004, the entirety of which is incorporated herein by reference. This application also claims the benefit of British Patent Application NO. 0321918.5 filed 19 Sep. 2003.

TECHNICAL FIELD

The invention relates to a focusing system and method, in particular to an automatic focusing system and method for focusing on a generally planar object in bright field microscopy, for example as used for examining silicon or other semiconductor wafers for the purpose of process control, and in particular for overlay metrology.

BACKGROUND

Automatic focus of an optical system requires the acquisition of information about the relative position of the object and the optical system. In many instances, the object approximates to a plane reflective surface, and the auto-focus will project a light beam onto the object and use the zero-order reflection from the object to determine the object distance.

Although such systems have been deployed with some success, they have suffered from a variety of disadvantages including: 1) that surface detail in localized regions of the object will affect the zero-order reflection and in some implementations will result in false readings; 2) that the light beam used for focus investigation may not have the same chromatic properties as the light which is used by the optical system when it is performing its intended task; 3) that the optical path of the system used for focus investigation may differ substantially from that used by the optical system when it is performing its intended task; 4) that such systems may employ a variety of artifacts which are not a part of the object under investigation, some of which may contribute to false readings.

The present invention may best be described in the context of its application with a bright-field microscope as used for examining silicon wafers for the purpose of process control. A particularly preferred application of the invention is for measurement of focus information in overlay metrology in which the focal conditions under which the data are gathered have a substantial impact on the quality of the data and this example is discussed in detail herein. Potentially however, the present invention could be used for any optical system in which there is a spatially-concentrated light-source.

In overlay metrology, light is injected into the top focal plane of a microscope objective to illuminate the object. Light reflected from that object is collected by the same objective and directed by means of a beam-splitter through an optical system to an imaging system which forms an image of the object. Typically this will comprise an array detector or detector such as a CCD camera. The object consists of a pair of marks produced by photolithography on a silicon wafer. Overlay metrology is the process whereby the relative positions of the two marks are measured. Historically, these marks have tended to be marks with four-way rotational symmetry which are positioned so that they are nominally concentric. One mark is larger than the other so that the two marks may easily be distinguished. They are referred to as the inner mark and the outer mark. Overlay marks generally have straight edges.

For the purpose of discussions herein, light used for gathering focus data will be referred to as the focus beam and light which is used when the optical system is performing its intended task (e.g. overlay metrology) will be referred to as the metrology beam.

One method by which the correct focal distance for an object may be determined is to gradually change the object distance while continuously gathering data from the image formed by the optical system. If there is a well-defined criterion by which the "best focus" position can be judged (e.g. maximum spatial frequency content of the image, maximum intensity gradient, etc.) then the data collected as the object distance varies may be analysed to determine at which focal distance the defined criterion is best complied with. Following this, the focus distance may be set to the identified best focus condition and the optical system can be used for metrology. Alternatively, if sufficient data were acquired during the through-focus scan, those data which were acquired in the out-of-focus condition may be discarded while those that were gathered at the in-focus condition will be used for metrology.

This methodology requires that a lot of data are acquired and analysed and is inevitably slow as time is taken up gathering data which are later discarded. To avoid this, many attempts have been made to develop auto-focus systems and auto-focus methods in which focus data may be acquired much more rapidly.

In many auto-focus systems, light beams are injected into the optical system by means of a beam-splitter. These injected beams will emerge from the objective, reflect from the surface of the object and return to the optical system. The injected beams have some character which may be measured in the returning beam and which will be modified by a change in the distance of the object.

These methods can give focus information within a much shorter time interval. Systems employing this principle include laser-spot focus systems, twin aperture measurement systems and astigmatic beam systems. Such auto-focus systems may work well in a range of conditions, but are subject to a number of practical limitations.

First, these systems generally assume that the object is a minor normal to the optical axis, and sample a limited region (or in some cases regions) of the object under investigation. Localized topography of the sample can result in false readings. Reflectance variation of the sample, etc. can cause degradation of the focus information that is obtained, as it changes the character of the light beam that is being measured. There are many situations in which these degradations are not present or are negligible, and some of these auto-focus systems work very well within a limited context. However, in the case of overlay metrology the requirement to achieve extreme focus sensitivity necessitates elimination of as many potential sources of uncertainty as possible.

Second, the focus beam may be very limited in the wavelengths that it can use, e.g. a laser spot focus system will usually be limited to a single wavelength. The light in the metrology beam may be from a broad band source. In any system in which chromatic aberration had not been perfectly eliminated (i.e. any refractive optical system) there would be some offset between the best focus determined using the focus beam and the focus required by the metrology beam. As there may be some chromatic filtration of the metrology beam by the object (e.g. thin-film filtration on the surface of a silicon wafer) the offset may vary from sample to sample and may not be known.

It would therefore be advantageous to use light with the same chromatic character for the focus beam as for the metrology beam.

SUMMARY

Several embodiments of the present invention mitigate some or all of the above disadvantages of prior art auto-focus systems and methods.

For example, particular embodiments of the present invention provide an auto-focus system and method in which the data required to determine an optimal focus point are acquired more rapidly and/or the collection of ultimately redundant focus data is minimised.

Another embodiment of the present invention provides an auto-focus system and method which can use light with the same chromatic character for the focus beam as for the main observational beam, in particular enabling the use of a broad band light source and/or enabling the use of the same light source for a focusing and an observational step. Use of the same light source ensures that the steps of focus analysis and observation are carried out using light with identical chromatic characteristics.

DETAILED DESCRIPTION

Several embodiments of the invention relate to focusing systems on microscopes having a light source, an objective lens or lens system, a light path to direct incident light through the objective lens or lens system to be reflected by the object, an aperture to limit the spatial extent of the incident light and serve as an illumination pupil, a light path to direct at least some of the reflected light to an imaging system, and an imaging system to image the reflected light so directed.

In accordance with selected embodiments of the invention, a method of automatically focusing such a system comprises directing a beam of light from a light source through an objective of a microscope system to an object whereby light is reflected from the surface thereof; collecting at least some of the light reflected thereby and directing the same to an imaging system, wherein the incident beam of light is limited in spatial extent by imaging an aperture to form an illumination pupil, the centroid of illumination of the illumination pupil is aligned with the incident optical axis of the instrument, and reflected light is projected to the imaging system comprising at least two images, for example at least one pair of images, from eccentric sections of an imaging pupil differentially displaced from the optical axis, and wherein the separation of the images thereby produced is determined to provide an indication of the object distance.

The differential displacement of the at least two images as the focus changes means that the separation distance also varies as the focus changes. The differential displacement comprises differential movement in extent and/or direction, preferably a pair of images displace in opposite directions.

In accordance with additional examples of the invention, a novel focus system and method are described in which focus information is gathered during a focusing stage about the object distance by observation of the object upon which it is desired to focus during a subsequent observational (for example metrology) stage using the light source that is used by the optical system when it is performing its intended observational task.

The method provides a very rapid method of determining the distance of an object and thus can be employed in determining an optimal focus position. It makes use of the aperture provided in the objective path to limit the spatial extent of the incident light beam, and of measurements related to the illumination pupil formed thereby. This is discussed in detail below.

The illumination beam which is injected into the top focal plane of the objective in an overlay-metrology tool or similar application is limited in its spatial extent. The boundary of this spot of light is formed by imaging an aperture. The image of this aperture in the top focal plane of the objective is often referred to as the illumination pupil, which term is used herein.

It will be understood to those skilled in the art of optical microscopy that if the imaging pupil in a reflecting microscope is eccentric with respect to a zero order projection of the illumination pupil then the image will move laterally with changes in focus conditions. By accurate centration of the illumination pupil, the image can be made to remain stationary with changes of object distance. This statement should be refined slightly in the case where the illumination pupil is not a perfect circle or is not uniformly illuminated. Under these circumstances, the fundamental required condition is that the centroid of illumination is placed on the optical axis. However, in the preferred case where the pupil is circular and evenly illuminated this will equate to a requirement that the pupil is centred on the optical axis.

The reference for perfect alignment is the axis formed by the imaging system. If the imaging pupil is off axis, compared to the axis defined by the illumination pupil a similar effect will occur.

The essence of the invention is to make images of the object using sections of the imaging pupil with differing eccentricities and to project them onto a single imaging means for example a single detector array. This pupil may then be split up into at least two sections by introduction of suitable image separation optics. At least two such images are collected for projection to different imaging areas but preferably relatively adjacent areas on a single imaging system. If the sections of the imaging pupil are displaced independently from perfect alignment, then the separate images will move differentially. Calculation of the separation of the images will then provide a measurement of the object distance. In a preferred embodiment the sections of the imaging pupil will be displaced in opposite directions to achieve maximum sensitivity.

In one possible embodiment, the method comprises successively repeating the above outlined method stages to obtain separate pairs of images from eccentric sections of the imaging pupil, measurements of the separation of the successive pairs of images being used, for example as part of iterative process, to improve the accuracy of the focusing information and/or to obtain focusing information varying spatially across an object, particularly to accommodate a degree of deviation from planarity. However, it will often be preferred if possible to determine in a single measuring stage the distance from focus, and to adjust in a single adjustment stage.

The light that is used for the focus investigation will typically have the same chromatic content as the light which is used for metrology. Preferably it will be from the same light source. The system will therefore not require calibration to remove chromatically induced offsets.

A separate optical system and imaging system can be used to investigate the focus condition. This will require a beam-splitter in order to extract light reflected from the sample. In this separate focus optical system, an image of the pupil of the primary imaging system is formed using suitable relay optics such as a relay lens. This pupil may then be split up by introduction of suitable image separation optics, so adapted that the separate sections of pupil will form separate images on the imaging means, for example of a detector array, provided as part of the focus optical system and imaging system.

In this case, the focus optical system is separate from the primary observational optical system which is used to image the object, obtain metrology data or other measured data therefrom, etc., once the focus has been determined. Such primary observational optical system will again comprise a suitable arrangement of optical elements to direct reflected light from the object to an observational imaging means, again preferably compromising a detector array. In the alternative, a single optical system with a common imaging means can be used first to investigate the focus condition and subsequently to conduct observation and/or measurement of the object.

In the preferred embodiment discussed herein, the simple device of a dihedral minor has been used to serve as the image separation optics. This simultaneously splits the pupil into two and redirects the light from the two halves to different sections of the CCD array provided as part of the focus optical system. This is by way of example only and it is not difficult to think of other systems to split the pupil though this is a particularly simple method.

In such a system the relative displacement between the two images when the microscope is in the lower focal plane of the objective lens or optics is dependent only on the dihedral angle and the focal length of the camera lens. If a single sensor is used then the offset at the in-focus position is extremely stable, providing immunity from mechanical variations which could result in drifting focus readouts.

In the focus optics detection means are required at least to determine the displacement of two images. The images will be very similar in many respects. It is therefore reasonable to use pattern recognition/correlation techniques (e.g. to store a portion of the first image and to determine where in the second image there is an object which correlates with the stored portion.) Using the position of the first portion of image as a starting point and knowing the direction of the displacement of illumination, the area of the second image that needs to be investigated will be very small and require little processing.

A field stop is preferably provided in the illumination beam from the light source. In this arrangement the field stop provides a feature the image of which is used by the focusing system to evaluate offset from ideal focus. The field stop is arranged to ensure that there is no overlap of the two images formed when the system is being used to investigate the focus condition. The size of the field stop is preferably selected with this intention in mind, but to ensure that this does not affect the image observed during the observation phase of operation. This can be achieved because the image of this stop is likely to be larger than the field of view during the observational phase which is carried out at high magnification, but effective as a limit stop at the lower magnification which right typically be used for the focus investigation. The size of the detector is also relevant. If the detector area were larger a larger spot size would be tolerable.

In accordance with a further aspect of the invention, a microscope auto-focus system is provided for the implementation of the foregoing method, and a microscope is provided equipped with such a system.

Specifically, such a system for a microscope comprises a light source, an objective lens system, a light path to direct incident light through the objective lens to be reflected by the object, an aperture to limit the spatial extent of the incident light and serve as an illumination pupil with the centroid of illumination on the optical axis, a light path to direct reflected light from the object to an imaging system, and an imaging system, and the system further comprises optics to project reflected light to the imaging system comprising at least two images from eccentric sections of an imaging pupil differentially displaced from the optical axis, and a camera to measure the separation of the images thereby produced to provide an indication of the object distance. Additionally there is a means to adjust mechanically the separation of the object being observed from the imaging objective lens, under the control of the focus system. For example there is provided a closed loop control system (CS, shown in FIG. 1) which provides the ability to adjust the mechanical position of the object based on processing the output signal from the focus system detector.

Preferably a first optical and imaging system is provided for focus images to be used to determine optimal focus position in a first focusing step, and a second optical and imaging system is provided for an observational image to be used in a subsequent observational (for example metrology) step, with a beam splitter and/or selective optics disposed therebetween to divert reflected light from an object selectively to either imaging system and/or partially to both.

The means to project reflected light to the imaging system comprising at least two images from eccentric sections of an imaging pupil includes suitable image separation optics which as set out above preferably comprises a dihedral minor.

Further preferred features of the system will be understood by analogy with reference to the description of preferred features of the method.

The invention will now be described by way of example only with reference to FIG. 1 of the accompanying drawings, illustrating an example focusing system in accordance with the invention.

The system illustrated in FIG. 1 is set up as a tool suitable for overlay metrology but will illustrate the general principles of the invention with more widespread applicability. The system illustrated in FIG. 1 includes separate optical systems to collect the imaging information to investigate the focus condition, and to collect the imaging information for metrology. These comprise the focus CCD camera 11 and the microscope CCD 13. Beam-splitter 15 extracts light reflected from the object to serve both these imaging systems.

A light source 21 directs a beam of light along the light path represented by the dotted line through an illumination lens 23 and objective lens 25 onto an object 26a at the object plane 26. The top focal plane of objective is identified by reference 24. Reflected light passes through the beam-splitter 15. The reflected light is directed via a relay optical system consisting in this example of a first imaging lens 27 onto a dihedral mirror 28. It is through the dihedral minor that the essential feature of the invention is enabled. The dihedral minor simultaneously splits the illumination pupil into two and redirects the light via the second imaging lens 29 to different sections of the focus CCD 11, comprising the first imaging region 31 and the second imaging region 32.

In order that there is no overlap of the two images on the focus camera, a field stop 33 is preferably included in the illumination beam of the microscope. This does not affect the image observed in the metrology channel because the image of this stop is larger than the field of view in the metrology channel but the focus camera system 11 works at lower magnification.

A further advantage of this stop is that the image of the stop also moves with object distance in the same way that the image of the object moves. The rate of movement of the image of the field stop is twice that of the rate of movement of the object, which is highly advantageous to the sensitivity of the focus system.

For analysis of the focus condition, image correlation methods can be employed. Such methods evaluate the variation with focus of the separation of the images of the field stop. However, these images contain data associated with features in the object which move with focus at a rate different to that of the image of the field stop. Further, the images contain phase information which produces asymmetric images if the pupil section is eccentric. Consequently the two image segments are not identical and the detail of the difference changes with the focus condition. Some means of filtering these characteristics is necessary to prevent loss of accuracy in the analysis results. A variety of techniques can be employed for the suppression of image detail, and will be familiar to those skilled in the art of image processing Once the focus condition has been investigated, the metrology camera CCD 13 is used for metrology observations. Light is directly thereat via the beam splitter 15 and microscope imaging lens 35 and mirror 36.

The invention claimed is:

1. A method of automatically focusing a microscope having a light source, an objective lens, a light path to direct incident light through the objective lens to be reflected by an object, an aperture to limit the spatial extent of the incident light and serve as an illumination pupil, a light path to direct at least some of the reflected light to an imaging system, and an imaging system to image the reflected light so directed, the method comprising: directing a beam of light from a light source through an objective of a microscope system to an object whereby light is reflected from the surface thereof; collecting at least some of the light reflected thereby and directing the same to an imaging system, wherein the incident beam of light is limited in spatial extent by imaging an aperture to form an illumination pupil, a centroid of illumination of the illumination pupil is aligned with an incident optical axis, and reflected light is projected to the imaging system in which the reflected light is split into at least two images from eccentric sections of an imaging pupil differentially displaced from the optical axis, and wherein the separation of the images thereby produced is determined to provide an indication of a focus condition.

2. The method of claim 1 wherein an illumination beam is injected into the top focal plane of the objective limited in its spatial extent and bounded by imaging an aperture so as to form an illumination in the top focal plane of the objective.

3. The method of claim 2 comprising the formation of a plurality of images of the object using sections of the imaging pupil with differing eccentricities and projecting the images onto a single imaging means within the imaging system.

4. The method of claim 3 wherein the imaging means comprises a single detector array.

5. The method of claim 1, further comprising successively repeating actions to obtain separate pairs of images from eccentric sections of the imaging pupil, measurements of the separation of the successive pairs of images being used as part of iterative process to improve the accuracy of the focus condition.

6. The method of claim 5, further comprising obtaining the focus condition varying spatially across an object to determine a degree of deviation from planarity.

7. The method of claim 1 wherein the light source that is used to produce the light beam that is reflected and directed to the imaging system the same light source as used for metrology.

8. The method of claim 1 wherein a beam splitter is used to extract light reflected from the object and direct the same towards the imaging system and a primary observational optical system, the imaging system being separate from the primary observational optical system which is used to image the object, obtain metrology data or other measured data therefrom.

9. The method of claim 1 comprising investigating the focus condition and subsequently conducting observation and/or measurement of the object.

10. The method of claim 1 wherein a field stop is provided as the aperture to limit the spatial extent of the incident light in the beam of light from the light source.

11. A method of automatically focusing a microscope having a light source, an objective lens, a light path to direct incident light through the objective lens to be reflected by an object, an aperture to limit the spatial extent of the incident light and serve as an illumination pupil, a light path to direct at least some of the reflected light to an imaging system, and an imaging system to image the reflected light so directed, the method comprising: directing a beam of light from a light source through an objective of a microscope system to an object whereby light is reflected from the surface thereof; collecting at least some of the light reflected thereby and directing the same to an imaging system, wherein the incident beam of light is limited in spatial extent by imaging an aperture to form an illumination pupil, a centroid of illumination of the illumination pupil is aligned with an incident optical axis, and reflected light is projected to the imaging system in which the reflected light is split into at least two images from eccentric sections of an imaging pupil differentially displaced from the optical axis, and wherein the separation of the images thereby produced is determined to provide an indication of a focus condition, the method further comprising using a dihedral minor to split the imaging pupil into the at least two images formed on different sections of an imaging means within the imaging system.

12. A microscope comprising:
   a light source;
   an objective lens and a first light path to direct incident light from the light source through the objective lens to be reflected by an object;
   an aperture that limits the spatial extent of the incident light and serves as an illumination pupil with the centroid of illumination from the illumination pupil on an optical axis;
   an imaging system and a second light path to direct reflected light from the object to the imaging system the imaging system comprising optics to split the reflected light into at least two images from eccentric sections of an imaging pupil differentially displaced from the optical axis, and a camera to measure the separation of the images thereby produced to provide an indication of a focus condition; and
   a control system to adjust mechanically the separation of the object from the objective lens.

13. A microscope in accordance with claim 12 wherein the imaging system is provided to determine optimal focus position in a first focusing step, the microscope comprising a second imaging system for subsequent observational step, and a beam splitter disposed between the imaging system and the second imaging system to divert reflected light from the object partially to both the imaging system and the second imaging system.

14. A microscope in accordance with claim 12 wherein the optics to split the reflected light into at least two images from eccentric sections of the imaging pupil comprises a dihedral minor.

15. A microscope in accordance with claim 12 wherein the imaging system is provided to determine optimal focus position in a first focusing step, the microscope comprising a second imaging system for subsequent observational step, and selective optics disposed between the imaging system and the second imaging system to divert reflected light from the object selectively to either the imaging system or the second imaging system.

* * * * *